United States Patent
Ruberte Sanchez et al.

(10) Patent No.: US 9,416,682 B2
(45) Date of Patent: Aug. 16, 2016

(54) TURBINE ENGINE ALIGNMENT ASSEMBLY

(71) Applicant: United Technologies Corporation, Hartford, CT (US)

(72) Inventors: Jose E. Ruberte Sanchez, Jupiter, FL (US); Joey Wong, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 818 days.

(21) Appl. No.: 13/710,770

(22) Filed: Dec. 11, 2012

(65) Prior Publication Data

US 2014/0161593 A1  Jun. 12, 2014

(51) Int. Cl.
*F01D 25/24* (2006.01)
*F02K 3/10* (2006.01)

(52) U.S. Cl.
CPC .............. *F01D 25/24* (2013.01); *F01D 25/243* (2013.01); *F02K 3/10* (2013.01); *F05D 2230/64* (2013.01); *Y10T 29/49817* (2015.01); *Y10T 29/49826* (2015.01)

(58) Field of Classification Search
CPC ............. F02K 3/10; F02K 3/08; F02K 3/105; F02K 3/11; F05D 2230/644; F05D 2230/64; F05D 2260/30; F01D 25/24; F01D 25/243
See application file for complete search history.

(56) References Cited

U.S. PATENT DOCUMENTS

| | | | | |
|---|---|---|---|---|
| 2,846,250 A | * | 8/1958 | Marshall | F02C 7/20 403/108 |
| 3,528,250 A | * | 9/1970 | Johnson | F02C 7/185 60/262 |
| 3,767,122 A | | 10/1973 | Sedgwick | |
| 4,208,774 A | | 6/1980 | Voyer et al. | |
| 4,441,323 A | | 4/1984 | Colley | |
| 4,487,015 A | | 12/1984 | Slattery et al. | |
| 4,595,216 A | * | 6/1986 | Ware | B60G 7/02 267/36.1 |
| 4,720,979 A | | 1/1988 | Mink | |
| 5,127,224 A | | 7/1992 | Barcza et al. | |
| 5,385,015 A | | 1/1995 | Clements et al. | |
| 7,328,496 B2 | | 2/2008 | Powers et al. | |
| 8,173,218 B2 | | 5/2012 | Mase et al. | |
| 2005/0262847 A1 | * | 12/2005 | Koshoffer | F23R 3/20 60/761 |
| 2010/0034616 A1 | | 2/2010 | Johnson | |
| 2012/0011854 A1 | | 1/2012 | Khan et al. | |

* cited by examiner

*Primary Examiner* — Andrew Nguyen
(74) *Attorney, Agent, or Firm* — Carlson, Gaskey & Olds, PC (57) ABSTRACT

An augmentor assembly for a gas turbine engine includes an alignment assembly disposed along an axis having a base and a plate. The base includes a plurality of grooves. The plate includes a plurality of flanges in mating engagement to the plurality of grooves. A first component and a second component are attached to the alignment assembly. The mating engagement of the plurality of grooves and the plurality of flanges is arranged to provide incremental adjustment to define a position of the first component relative to the second component.

4 Claims, 6 Drawing Sheets

TURBINE ENGINE ALIGNMENT ASSEMBLY

This invention was made with government support under Contract No. N00019-02-C-3003 by the United States Navy. The Government has certain rights in this invention.

BACKGROUND

This disclosure relates to an alignment assembly, and more specifically to an alignment assembly for use in a turbine engine.

During assembly, turbine engine components are arranged and aligned based on design specifications. The arrangement and alignment between components of a gas turbine engine is intended to be maintained during operation.

Alignment features provided on mating components of turbine engine include mating features that define relative positions between components. A desired alignment between turbine engine components may be altered or lost during assembly and disassembly due to removal or movement between components. Further, vibrations and other external forces encountered during operation may also result in loss of a desired alignment between turbine engine components. Gas turbine engine manufacturers continue to seek increased efficiencies for assembling, disassembling and maintaining engines during the operational life of a gas turbine engine.

SUMMARY

In one non-limiting disclosed embodiment, an augmentor assembly for a gas turbine engine includes an alignment assembly disposed along an axis having a base and a plate. The base includes a plurality of grooves. The plate includes a plurality of flanges in mating engagement to the plurality of grooves. A first component and a second component are attached to the alignment assembly. The mating engagement of the plurality of grooves and the plurality of flanges is arranged to provide incremental adjustment to define a position of the first component relative to the second component.

In a further embodiment of the above example, the base includes a first opening aligned with a slot of the plate. The first opening has a circumferential area greater than the slot.

In a further embodiment of any of the above examples, the slot is sized to receive and hold a bolt for attaching the first component to the alignment assembly.

In a further embodiment of any of the above examples, the bolt attaches the first component to the alignment assembly. The first opening is sized to receive the bolt in a plurality of circumferential positions. A portion of the bolt is disposed in a first circumferential position in the first opening in response to incremental adjustment of the plate relative to the base.

In a further embodiment of any of the above examples, the base includes a first opening aligned with a mount opening of the plate. The mount opening has a circumferential area greater than the first opening.

In a further embodiment of any of the above examples, the first opening is sized to receive a bolt for attaching the base to the plate.

In a further embodiment of any of the above examples, the bolt attaches the base to the plate in a plurality of positions of the mount opening relative to the first opening.

In a further embodiment of any of the above examples, the incremental adjustment of the plate is provided by positioning the plurality of flanges in a different groove.

In a further embodiment of any of the above examples, the plurality of grooves and the plurality of flanges are arranged perpendicular to the axis.

In a further embodiment of any of the above examples, the incremental adjustment of the plate provides a plurality of plate positions in a circumferential direction relative to the axis.

In a further embodiment of any of the above examples, the plurality of grooves and the plurality of flanges are arranged at an angle relative to the axis.

In a further embodiment of any of the above examples, the incremental adjustment of the plate provides a plurality of plate positions in a circumferential direction and a radial direction relative to the axis.

In a further embodiment of any of the above examples, the plurality of grooves and the plurality of flanges have an equivalent geometric shape and an equivalent width.

In a further embodiment of any of the above examples, the alignment assembly is configured to provide an incremental adjustment of about 0.04 inches (0.102 cm).

In one non-limiting disclosed embodiment, a gas turbine engine includes a fan section disposed along an engine axis, a compressor section in fluid communication with the fan section, a combustor section in fluid communication with the compressor section, a turbine section, in fluid communication with the combustor section, for driving the compressor section and the fan section, and an augmentor section in fluid communication with the turbine section. The augmentor section includes an augmentor assembly having an alignment assembly disposed along an axis having a base and a plate. The base includes a plurality of grooves and the plate includes a plurality of flanges corresponding to the plurality of grooves. A flame tube and an airfoil are attached to the alignment assembly. The mating engagement is arranged to provide incremental adjustment to define a position of the flame tube relative to the airfoil.

In a further embodiment of any of the above examples, the base includes a first opening aligned with a slot of the plate. The first opening has a circumferential area greater than the second opening. A bolt is fixed in the slot and attaches the flame tube to the alignment assembly. The first opening is sized to provide a plurality of circumferential positions such that incremental adjustment of the plate relative to the base positions the bolt at a first position of the plurality of circumferential positions.

In one non-limiting disclosed embodiment, a method of assembling an augmentor assembly includes providing an alignment assembly having a base and a plate. The base includes a plurality of grooves and the plate includes a plurality of flanges aligned with corresponding plurality of grooves. A position of the plate is incrementally adjusted relative to the base by orienting the plurality of flanges into mating engagement with the plurality of grooves that corresponds to a different relative position between the base and the plate. A first component is oriented relative to a second component by the incremental adjustment of the plate relative to the base portion. The first component and the second component are attached to the alignment assembly.

In a further embodiment of any of the above examples, adjusting the plate incrementally orients the plate and attached first component in a circumferential and radial direction.

In a further embodiment of any of the above examples, the method further includes aligning a slot of the plate with a first opening of the base. The first opening has a larger cross sectional area than the slot. A mount opening of the plate is aligned with a second opening of the base. The mount opening has a larger cross sectional area than the second opening. A pin extends through the slot and the first opening and is fixedly held in the slot to attach the first component and second component to the alignment assembly. The base is attached to the plate with a bolt extending through the mount opening and the second opening. A bolt is fixedly held in the second opening.

In a further embodiment of any of the above examples, the method further includes attaching the plate to the base. The first component is removed from the alignment assembly. A replacement component is attached to the alignment assembly while the plate remains attached to the base.

Although the different examples have the specific components shown in the illustrations, embodiments of this disclosure are not limited to those particular combinations. It is possible to use some of the components or features from one of the examples in combination with features or components from another one of the examples.

BRIEF DESCRIPTION OF THE DRAWINGS

This disclosure can be further understood by reference to the following detailed description when considered in connection with the accompanying drawings, wherein.

DETAILED DESCRIPTION

Figure 1:
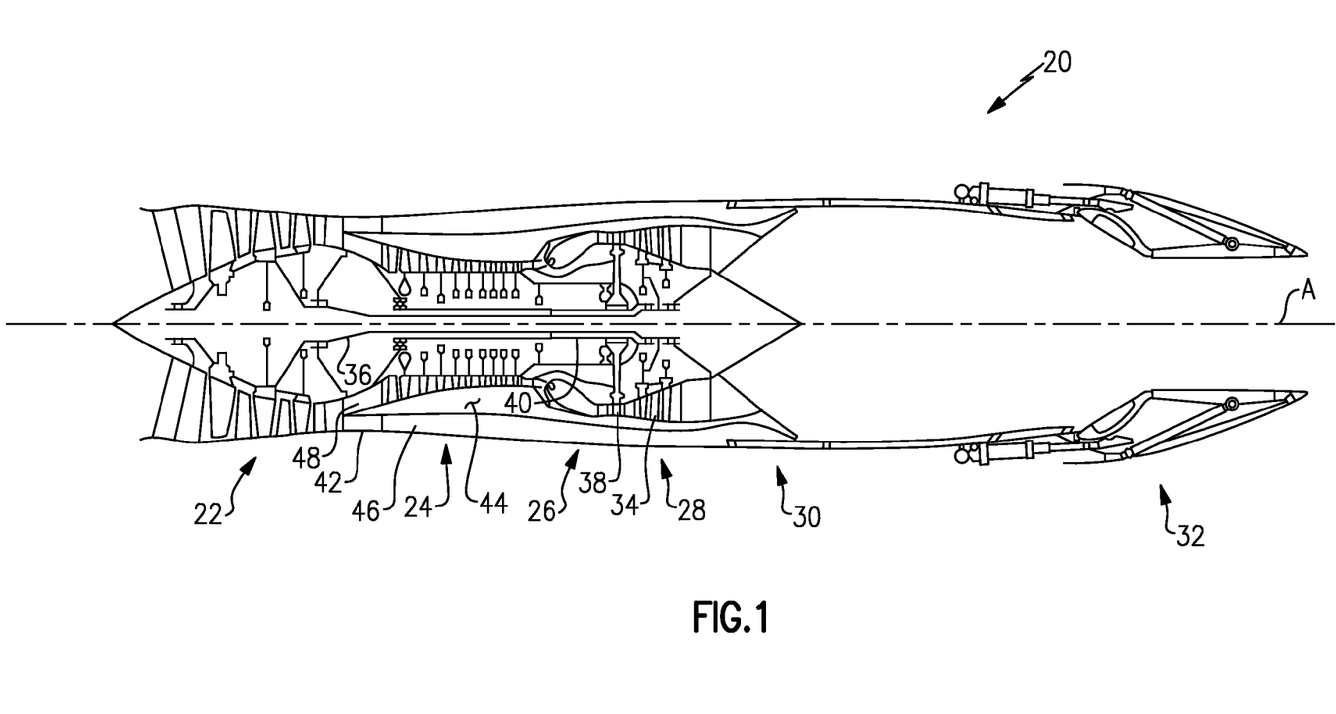
FIG. 1 is a schematic view of an example gas turbine engine.

FIG. 1 schematically illustrates an example gas turbine engine 20. The example gas turbine engine 20 includes a fan section 22, a compressor section 24, a combustor section 26, a turbine section 28, an augmentor section 30 and a nozzle section 32. The sections are defined along a central longitudinal engine axis A. Although the disclosed example gas turbine engine is an augmented low bypass gas turbine engine, it should be understood that the concepts described herein are applicable to other gas turbine engines including geared architecture engines, direct drive turbofans, turboshaft engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine 20 may define the outer engine case structure 42 and the inner engine structure 44 which support the core engine therein.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

Figure 2:
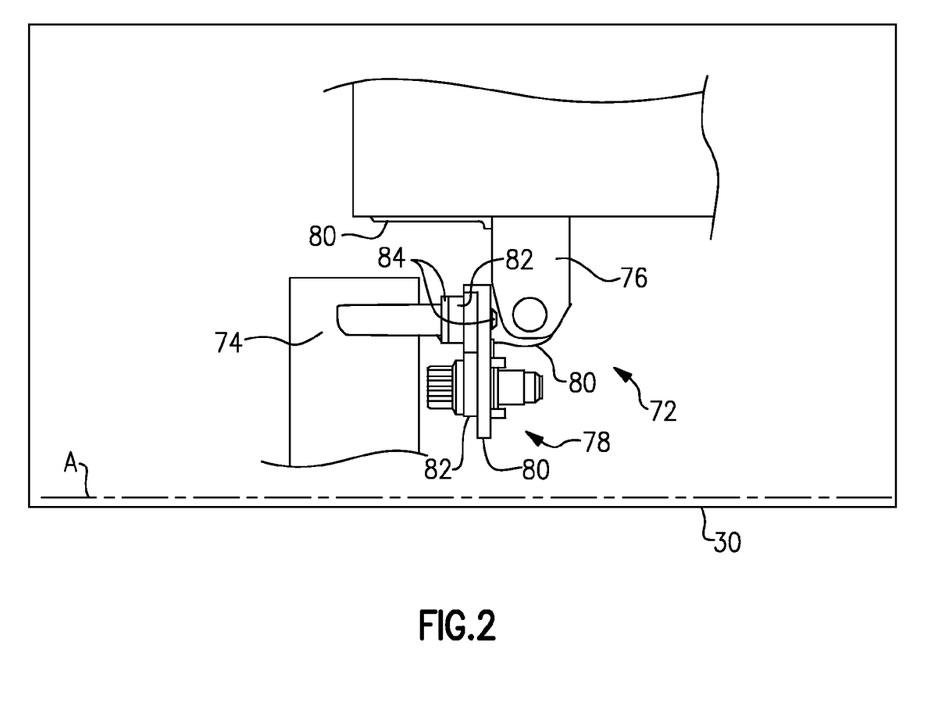
FIG. 2 is a perspective view of an example augmentor assembly.

Referring to FIG. 2, a portion of the augmentor section 30 is shown schematically and includes an augmentor assembly 72 having a first component 74, a second component 76, and an alignment assembly 78 disposed along engine axis A. The alignment assembly 78 includes a base 80 engaging a plate 82. In this example, the first component 74 is attached to the alignment assembly 78 by pin 84. In one non-limiting example, the first component 74 is a flame tube and the second component 76 is an airfoil. Although the example alignment assembly 78 is described by way of the disclosed components 74, 76, other mating components may also benefit from these disclosures. In one example, base 80 is integrally formed with component 76.

Figure 3:
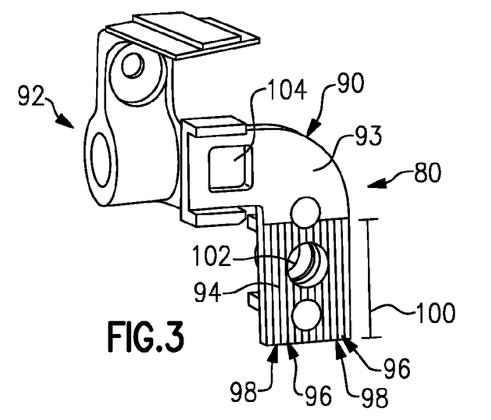
FIG. 3 is a perspective view of an example base portion of the alignment assembly of FIG. 2.

Referring to FIG. 3, the base 80 of the example alignment assembly 78 includes a generally L-shaped portion 90 and second portion 92 extending from the generally L-shaped portion 90. Alternatively, portion 90 may be generally rectangular. The L-shaped portion 90 includes a first base side 93. The first base side 93 includes a base mating surface 94 having a plurality of flanges 96 protruding from the first base side 93 and defining a plurality of grooves 98. The plurality of flanges 96 and plurality of grooves 98 extend along length 100 of the L-shaped portion 90 to stabilize and maintain a relative position between the first component 74 and the second component 76 (shown in FIG. 2). The length 100 provides a mating surface area and may be modified to tailor stability between mating components.

A first opening 102 extends through the L-shaped portion 90 at the base mating surface 94. The first opening 102 is sized to receive and secure a bolt 105 (shown in FIG. 5) for attaching the base 80 to the plate 82. The L-shaped portion 90 also includes second opening 104 that extends through the L-shaped portion 90 and is sized to receive pin 84 that attaches first component 74 to the alignment assembly 78. In this example, the second opening 104 is spaced from the base mating surface 94.

In the disclosed example, the first opening 102 is generally cylindrical and the second opening 104 is generally rectangular and includes generally rounded corners. Other geometric configurations of first opening 102 and second opening 104 could be utilized and are within the contemplation of this disclosure.

Figure 4:
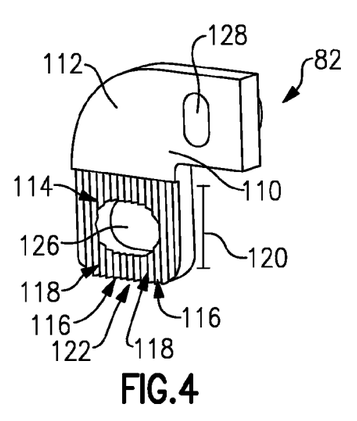
FIG. 4 is a perspective view of an example plate of the alignment assembly of FIG. 2.

Referring to FIG. 4, the plate 82 of an example alignment assembly 78 includes a generally L-shaped body 110 having a first plate side 112. Alternatively, body 110 may be generally rectangular. The first plate side 112 includes a plate mating surface 114 having a plurality of flanges 116 protruding from the first plate side 112 to define a plurality of grooves 118 between flanges 116. The plurality of flanges 116 mate with a corresponding plurality of grooves 98 of the base 80 (FIG. 3). Corresponding grooves 118 mate with corresponding plurality of flanges 96 of the base 80 (FIG. 3). The plurality of flanges 116 and plurality of grooves 118 extend a length 120 from an end 122 of the L-shaped body 110 determined to provide a desired mating area tailored to application specific system parameters to stabilize a relative position between the first component 74 and second component 76 (shown in FIG. 2). The length 120 defines a mating surface area and may be modified to tailor stability as needed.

A mount opening 126 extends through the L-shaped body 110 at the plate mating surface 114. The mount opening 126 is sized to receive the bolt 105 (shown FIG. 5) for attaching the base 80 to the plate 82. The L-shaped body 110 also includes slot 128 that extends through the L-shaped body 110 and is sized to receive and secure the pin 84 to attach the first component 74 to the alignment assembly 78. In this example, the slot 128 is spaced from the plate mating surface 114.

Figure 5:
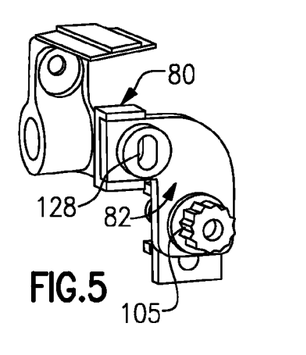
FIG. 5 is a perspective view of the example alignment assembly of FIG. 2.

Referring to FIG. 5, with continued reference to FIGS. 3 and 4, the base 80 and the plate 82 are aligned such that base mating surface 94 faces and abuts plate mating surface 114 of plate 82. The plate 82 mates with the base 80 such that first opening 102 of the base 80 aligns with a corresponding portion of the mount opening 126 of plate 82. Once the plate 82 is positioned with respect to the base 80, bolt 105 is inserted through the mount opening 126 and the first opening 102 to fix the plate 82 to the base 80.

The base 80 and the plate 82 are also aligned such that the slot 128 of plate 82 aligns with a corresponding portion of second opening 104 of the base 80. Both the slot 128 and second opening 104 are sized to receive the pin 84 (shown in FIG. 2) to attach the first component 74 to the alignment assembly 78.

The bolt 105 attaches the base 80 and the plate 82 such that the plurality of flanges 116 of the plate 82 mate with the corresponding plurality of grooves 98 of the base 80 and the plurality of grooves 118 of the plate 82 to mate with the corresponding plurality of flanges 96 of the base 80.

In this example, the base 80 and the plate 82 may be fabricated from a composite material or a metal material. Moreover, the specific material utilized for the disclosed alignment assembly 78 can be of any material selected depending on the environment and location within the gas turbine engine.

Figure 6A:
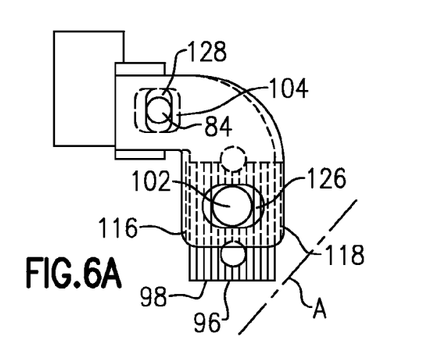
FIG. 6A is a side perspective view of the alignment assembly of FIG. 2 with a plate in a first position.
Figure 6B:
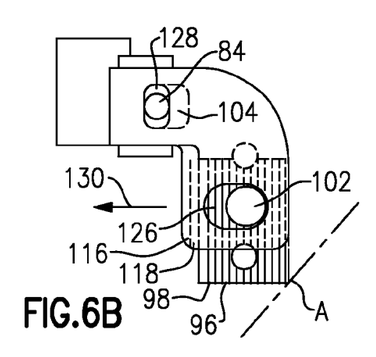
FIG. 6B is a side perspective view of the alignment assembly of FIG. 2 with a plate in a second position.
Figure 6C:
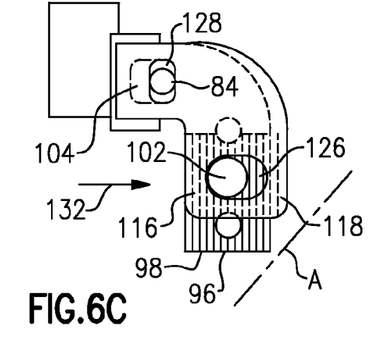
FIG. 6C is a side perspective view of the alignment assembly of FIG. 2 with a plate in a third position.

Referring to FIG. 6A-6C, the example plate 82 is aligned with the base 80, shown partially in phantom. The plurality of flanges 116 of the plate 82 mate with the corresponding plurality of grooves 98 of the base 80 and the plurality of grooves 118 of the plate 82 mate with corresponding plurality of flanges 96 of the base 80.

The mount opening 126 of the plate 82 has a greater cross sectional area than the first opening 102 of the base 80. The second opening 104 of the base 80 has a greater cross sectional area than the slot 128 of the plate 82. The plate 82 can be incrementally adjusted in a first circumferential direction, shown by arrow 130, or a second circumferential direction, shown by arrow 132, such that at least one of the plurality of flanges 116 of plate 82 mates with a different one of the plurality of grooves 98 of the base 80. As the slot 128 holds the pin 84, incremental adjustment of the plate 82 moves the pin 84 and attached first component 74 circumferentially in the second opening 104 of the base 80 thus providing alignment of the first component 74 relative to the second component 76.

The greater cross sectional area of the second opening 104 of the base 80 in relation to a cross sectional area of the slot 128 of the plate 82 facilitates incremental adjustment by allowing circumferential movement of the portion of pin 84 passing through the second opening 104. Similarly, the greater cross sectional area of the mount opening 126 of the plate 82 in relation to a cross sectional area of the first opening 102 of the base 80 facilitates incremental adjustment by providing repositioning of the mount opening 126 of the plate 82 in a plurality of positions relative to the first opening 102 of the base 80 while receiving the bolt 105.

Figure 7:
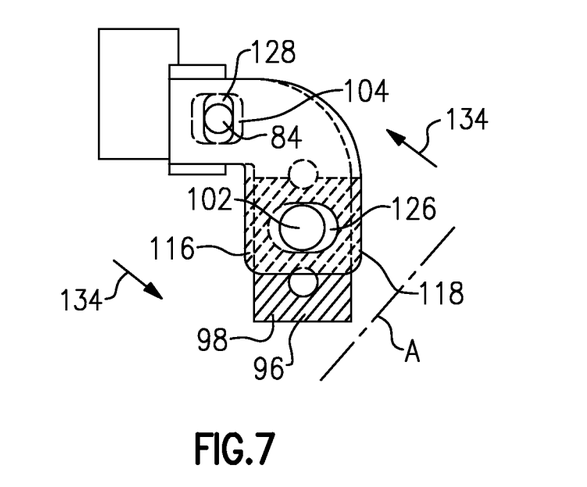
FIG. 7 is another side perspective view of the alignment assembly of FIG. 2 with a plate in a first position.

Referring to FIG. 7, with continued reference to FIGS. 6A-6C, the example plate 82 is aligned with the base 80, shown partially in phantom. The plurality of flanges 116 of the plate 82 mates with the corresponding plurality of grooves 98 of the base 80 and the plurality of grooves 118 of the plate 82 to mate with corresponding plurality of flanges 96 of the base 80.

In this example, the plurality of flanges 116 and plurality of grooves 118 of the plate 82 and corresponding plurality of flanges 96 and plurality of grooves 98 of the base 80 are disposed at an angle relative to engine axis A to provide incremental adjustment of the plate 82 relative to the base 80 in both the circumferential and radial direction, as shown by arrows 134.

Figure 8:
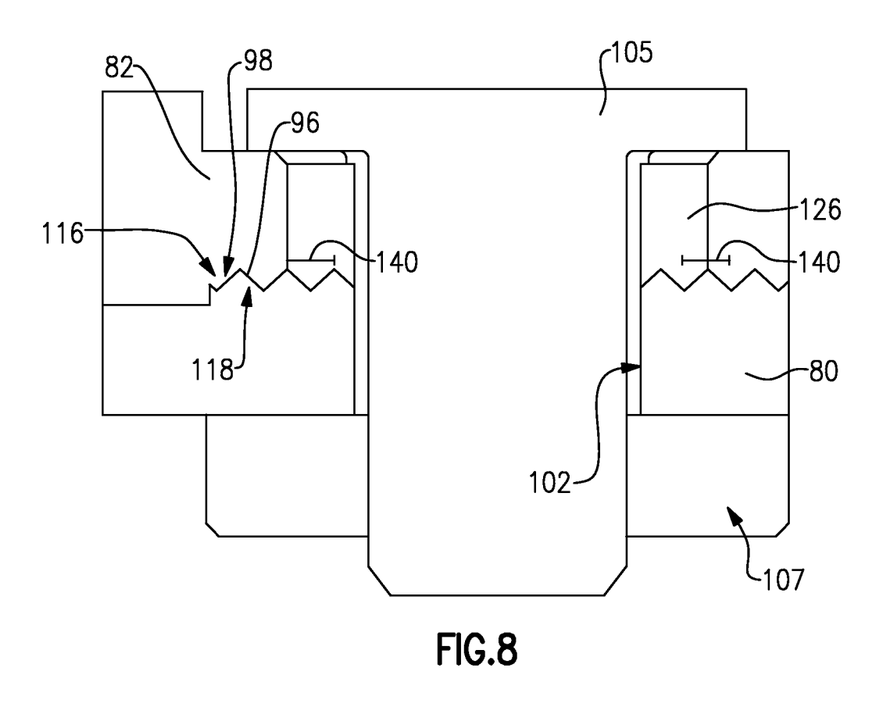
FIG. 8 is a cross sectional view of the alignment assembly.

FIG. 8 is a schematic representation of the flanges 116 and the grooves 118 of the plate 82 mated with corresponding grooves 98 and flanges 96 of the base 80. The plurality of flanges 116 may engage different sets of grooves 98 in the circumferential direction to position plate 82 relative to base 80. The mount opening 126 is sized to provide for alternate relative positions between the plate 82 and base 80 with the bolt 105 extending therethrough. Bolt 105 engages nut 107 for retention of the bolt 105.

Each of the example plurality of flanges 96, 116 includes a width 140 that is provided to accommodate incremental adjustment of a position between the plate 82 and base 80 by positioning the plurality of flanges 96, 116 relative to corresponding grooves 118, 98. In one disclosed non-limiting dimensional example, the width 140 of the plurality of flanges 96, 116 is about 0.04 inches (0.102 cm) and corresponds to provide incremental adjustment of about 0.04 inches (0.102 cm).

In this example, the plurality of flanges 96, 116 and the plurality of grooves 98, 118 each have a triangular cross sectional geometry. Other groove cross-sectional geometries are also within the contemplation of this disclosure.

Figure 9A:
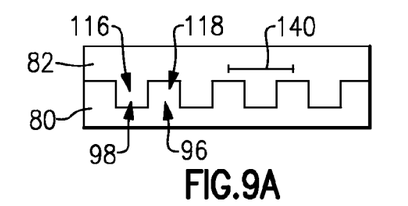
FIG. 9A is a cross sectional view of a geometrical configuration of the mating surfaces of the alignment assembly.

Referring to FIG. 9A, another example base 80 and plate 82 have a plurality of flanges 96, 116 and a plurality of grooves 98, 118, respectively, including a square cross sectional geometry. Each of the example plurality of flanges 96, 116 includes a width 140 that is provided to accommodate incremental adjustment equal to the width to position the plate 82 and base 80 by positioning the plurality of flanges 96, 116 relative to corresponding grooves 118, 98.

Figure 9B:
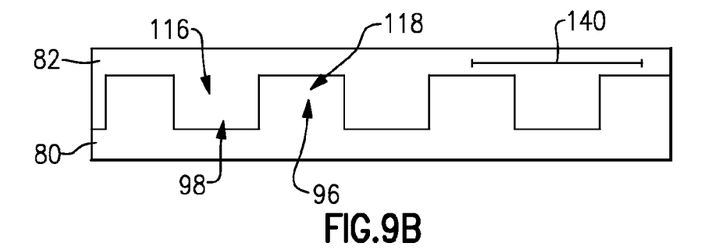
FIG. 9B is a cross sectional view of another geometrical configuration of the mating surfaces of the alignment assembly.

Referring to FIG. 9B, another example base 80 and plate 82 have a plurality of flanges 96, 116 and a plurality of grooves 98, 118, respectively, including a rectangular cross sectional geometry. Each of the example plurality of flanges 96, 116 includes a width 140 that is provided to accommodate incremental adjustment equal to the width to position the plate 82 and base 80 by positioning the plurality of flanges 96, 116 relative to corresponding grooves 118, 98.

Figure 9C:
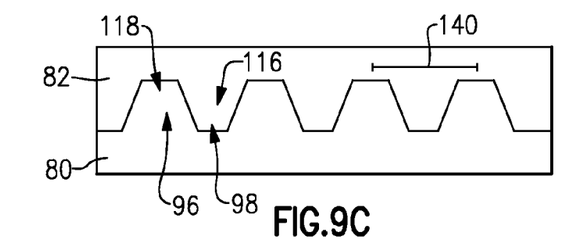
FIG. 9C is a cross sectional view of another geometrical configuration of the mating surfaces of the alignment assembly.

Referring to FIG. 9C, yet another example base 80 and plate 82 have a plurality of flanges 96, 116 and a plurality of grooves 98, 118, respectively, including a trapezoidal cross sectional geometry. Each of the example plurality of flanges 96, 116 includes a width 140 that is provided to accommodate incremental adjustment equal to the width to position the plate 82 and base 80 by positioning the plurality of flanges 96, 116 relative to corresponding grooves 118, 98.

Figure 9D:
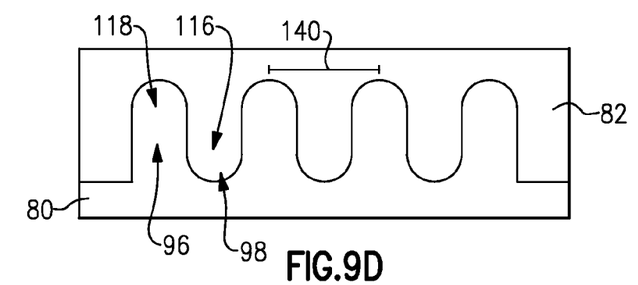
FIG. 9D is a cross sectional view of another geometrical configuration of the mating surfaces of the alignment assembly.

Referring to FIG. 9D, still another example base 80 and plate 82 have a plurality of flanges 96, 116 and a plurality of grooves 98, 118, respectively, including a cross sectional geometry having a partial rectangular portion and a partial semi-circular portion. Each of the example plurality of flanges 96, 116 includes a width 140 that is provided to accommodate incremental adjustment equal to the width to position the plate 82 and base 80 by positioning the plurality of flanges 96, 116 relative to corresponding grooves 118, 98.

Figure 9E:
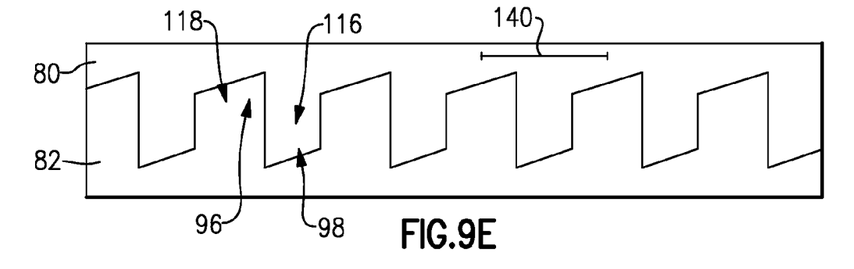
FIG. 9E is a cross sectional view of another geometrical configuration of the mating surfaces of the alignment assembly.

Referring to FIG. 9E, another base 80 and plate 82 have a plurality of flanges 96, 116 and a plurality of grooves 98, 118, respectively, including another trapezoidal cross sectional geometry. Each of the example plurality of flanges 96, 116 includes a width 140 that is provided to accommodate incremental adjustment equal to the width to position the plate 82 and base 80 by positioning the plurality of flanges 96, 116 relative to corresponding grooves 118, 98.

Although the features described herein are described in relation to an augmentor assembly 72, the described features of the alignment assembly 78 may alternatively provide alignment between other components such as for example, a fuel nozzle mounted to a case within the combustor section 26.

Figure 10:
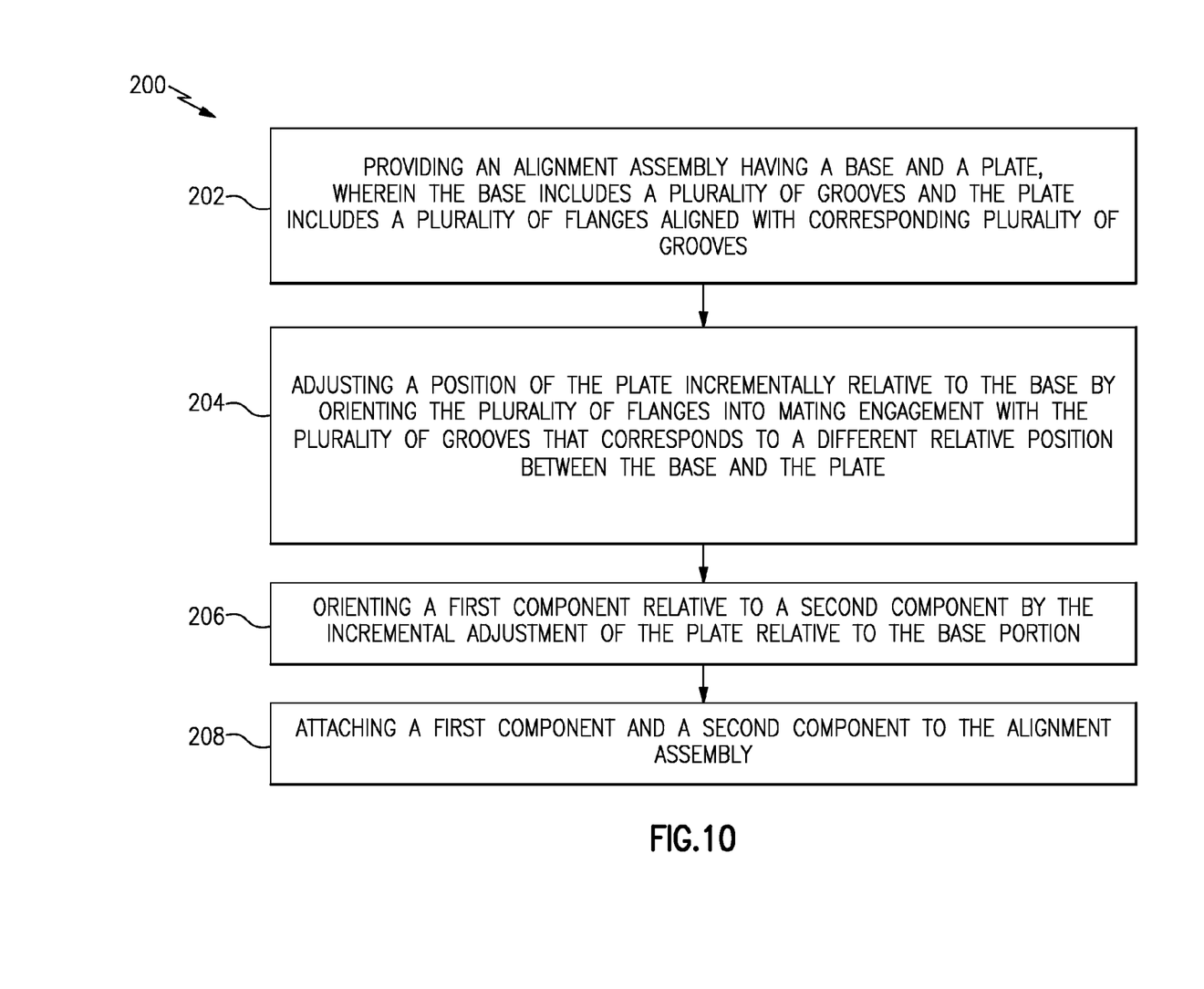
FIG. 10 is a flow chart of an example method of assembling and aligning an augmentor assembly.

Referring to FIG. 10, an example method of assembling an augmentor assembly is schematically indicated at 200 and includes an initial step indicated at 202, of providing an alignment assembly 78 having a base 80 and a plate 82. The base 80 includes a plurality of grooves 98 and the plate 82 includes a plurality of flanges 116 aligned with the grooves 98. A position of the plate 82 is incrementally adjusted relative to the base 80 by orientating the plurality of flanges 116 into mating engagement with the plurality of grooves 98 to correspond to a desired relative position between the base 80 and the plate 82, as is indicated at 204. A first component 74 is oriented relative to a second component 76 by the incremental adjustment of the plate relative to the base 80 as indicated at 206. The first component 74 and the second component 76 are attached to the alignment assembly 78 as is indicated at 208. A bolt is then inserted and fastened to fix a position of the base 80 to the plate 82.

If one of the components are damaged, otherwise requires replacement, or requires disassembly for inspection purposes, a replacement component (not shown) or the previously removed component may be provided and attached to the alignment assembly 78 in the same manner as the first component 74. The replacement component can be attached and assembled into the augmentor assembly without otherwise changing, adjusting, or removing the second component or any additional components of the alignment assembly.

During replacement, the alignment assembly 78 stays positioned such that the replacement component may be attached without additional adjustment of the alignment assembly.

Although an example embodiment has been disclosed, a worker of ordinary skill in the art would recognize that certain modifications would come within the scope of the claims. For example, any feature of the various examples described above may be used with any other feature of a different example. For that reason, the following claims should be studied to determine their true scope and content.

What is claimed is:

1. A method of assembling an augmentor assembly comprising:
   providing an alignment assembly having a base and a plate, wherein the base includes a plurality of grooves and the plate includes a plurality of flanges aligned with corresponding plurality of grooves;
   adjusting a position of the plate incrementally relative to the base by orienting the plurality of flanges into mating engagement with the plurality of grooves that corresponds to a different relative position between the base and the plate;
   orienting a first component relative to a second component by the incremental adjustment of the plate relative to the base portion;
   attaching the first component and the second component to the alignment assembly;
   aligning a slot of the plate with a first opening of the base, the first opening having a larger cross sectional area than the slot;
   aligning a mount opening of the plate with a second opening of the base, the mount opening having a larger cross sectional area than the second opening, wherein a pin extends through the slot and the first opening and is fixedly held in the slot to attach the first component and second component to the alignment assembly; and
   attaching the base to the plate with a bolt extending through the mount opening and the second opening, wherein a bolt is fixedly held in the second opening.

2. The method of claim 1, wherein adjusting the plate incrementally orients the plate and attached first component in a circumferential and radial direction.

3. A method of assembling an augmentor assembly comprising:
   providing an alignment assembly having a base and a plate, wherein the base includes a plurality of grooves and the plate includes a plurality of flanges aligned with corresponding plurality of grooves;
   adjusting a position of the plate incrementally relative to the base by orienting the plurality of flanges into mating engagement with the plurality of grooves that corresponds to a different relative position between the base and the plate;
   orienting a first component relative to a second component by the incremental adjustment of the plate relative to the base portion;
   attaching the first component and the second component to the alignment assembly; attaching the plate to the base;
   removing the first component from the alignment assembly; and
   attaching a replacement component to the alignment assembly while the plate remains attached to the base.

4. The method of claim 3, further comprising:
   aligning a slot of the plate with a first opening of the base, the first opening having a larger cross sectional area than the slot;
   aligning a mount opening of the plate with a second opening of the base, the mount opening having a larger cross sectional area than the second opening, wherein a pin extends through the slot and the first opening and is fixedly held in the slot to attach the first component and second component to the alignment assembly; and attaching the base to the plate with a bolt extending through the mount opening and the second opening, wherein a bolt is fixedly held in the second opening.

* * * * *